March 18, 1958  R. O. PETERSON  2,826,776
BRUSH
Filed Feb. 4, 1952  3 Sheets-Sheet 1

INVENTOR.
RUBEN O. PETERSON
BY
Oberlin & Limbach
ATTORNEYS.

March 18, 1958     R. O. PETERSON     2,826,776
BRUSH
Filed Feb. 4, 1952     3 Sheets-Sheet 2

INVENTOR.
RUBEN O. PETERSON
BY
Oberlin & Limbach
ATTORNEYS.

March 18, 1958 R. O. PETERSON 2,826,776
BRUSH
Filed Feb. 4, 1952 3 Sheets-Sheet 3

INVENTOR.
RUBEN O. PETERSON
BY
Oberlin & Limbach
ATTORNEYS.

United States Patent Office 2,826,776
Patented Mar. 18, 1958

2,826,776

BRUSH

Ruben O. Peterson, University Heights, Ohio, assignor to The Osborn Manufacturing Company, Cleveland, Ohio, a corporation of Ohio Application February 4, 1952, Serial No. 269,819

15 Claims. (Cl. 15—179)

This invention relates to brush construction and, more particularly, to a novel form of brushing tool having operating characteristics never before achieved.

In the manufacture of power driven rotary brushes and the like and particularly wire brushes, it has always been considered necessary to employ brushing material which is as tough as possible and which consequently has relatively high damping capacity and low hardness. Numerous disadvantages always previously considered unavoidable have flowed from such limitations. Wire and the like having a high damping capacity is also relatively soft and the ends of the material accordingly wear back and round over, thereby losing their cutting ability rather rapidly. Materials of this type do not have the requisite hardness to afford the degree of cutting action desired for the removal of flash, burrs, oxide coatings and the like. As a result, grinding wheels have generally been employed for this type of work. A grinding operation, however, unless performed with very accurately adjusted equipment, often mars the work surface to a degree requiring a further finishing operation, as by brushing, for example. It is accordingly a primary object of my invention to provide a brushing tool in which the brush material may be of a relatively high degree of hardness and the brush construction designed to provide adequately for the damping of destructive vibration.

Brush material of the type which I employ, e. g. hard tempered steel wire and glass fiber, is not only relatively brittle but its tendency to fracture in use is greatly increased by secondary factors. Very slight scratches on the surface of a glass fiber strand, such as result from interaction of such strands in a rapidly rotating brush are sufficient to cause fracture of the strands and rapid destruction of the brush. While this same effect is an important cause of self-destruction of wire brushes of the type in question, another effect, namely corrosion due to atmospheric, operating, and storage conditions, is a still more serious cause of deterioration. In fact, when operating a power brush at a relatively high speed of rotation the impact of the brush wire against the air has the effect of raising the atmospheric pressure thereagainst, greatly increasing the ability of the air to oxidize steel wire, particularly at the somewhat elevated temperatures developed by operation of the brush. Changes in humidity during storage and contact with sweaty fingers are other corrosion accelerators. Once corrosion has commenced, the percentage fracture of the brush material is greatly increased.

Since brushes of this type are commonly employed to apply powdered abrasive and the like to a work-piece, it is obvious that a certain amount of such abrasive will find its way between the strands or bristles and initiate further premature fracture of the same.

When suitable hard brush materials are mounted in a brush back for use as a power brush, there is a tendency for vibrations resulting from operation of the brush to be communicated to concentrated points or areas along the length of the brush material strands. Such concentration of vibratory stresses induces fracture of the brush material at points well back from the working face of the brush and greatly reduces the life of the latter. Brush material such as wire has in the past been crimped or twisted to minimize such concentrations of stress. When properly crimped for a given density of a given brush material, the strands support each other to a considerable extent and tend to confine the points of fracture near the working face of the brush. Similarly, when a tuft of brush wire, for example, is twisted to form a coiled knot of such wire, the individual wires thus closely associated tend to support each other and to diffuse the vibratory stresses in such manner as to reduce breakage at points far back from the working face of the brush.

Certain objects of this invention are therefore as follows:

To provide a brushing tool having improved cutting capacity and increased life;

To provide a tool of great cutting capacity yet capable of leaving a relatively smooth finish on the work as compared to the usual grinding wheel or similar fast cutting tool;

To provide a brushing tool modified for more effective application of abrasive;

To provide a brushing tool adapted to operate as an exceedingly short trim brush;

To provide a brushing tool which will wear back evenly in use, providing a face of the same width and operating characteristics at all times;

To provide a brushing tool having hard brush material of low damping capacity associated with other material of a high damping capacity effective to prevent concentration of vibratory stresses at points far back from the working face with resultant long fracture of such brush material;

To provide a brushing tool in which the ends of the brush material will themselves progressively crumble or fracture in use and thereby remain sharp and effective rather than rounding over;

To provide a brushing tool in which the brush material is supported in a novel manner effective both to enhance its cutting capacity and to protect it from scratches, corrosion, and similar deteriorating influences.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

As above indicated, I employ brush material which may be of a high degree of hardness and embed such material in a base or matrix of suitable high damping capacity material.

CONSTRUCTION

Many well-known types of brushes are adapted to be modified in accordance with my invention to produce my new brushing tool. Reference may be had to my prior Patents Nos. 2,303,386; 2,316,185; and 2,421,647 as well as to Whittle Patent No. 2,288,337 and Bickel et al. Patent No. 2,062,047 for typical examples of well-known power driven rotary brushes which are thus suitable for use.

Figure 1:
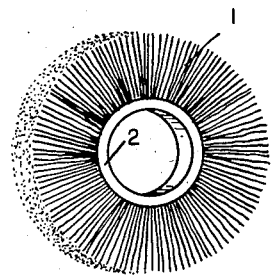
Fig. 1 is a perspective view substantially in side elevation of a typical annular rotary brush section.
Figure 2:
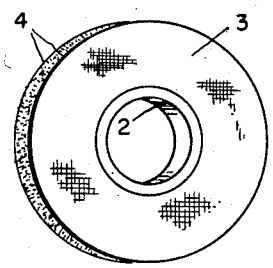
Fig. 2 is a similar view showing a brushing tool in accordance with my invention incorporating the brush of Fig. 1.

Referring now more particular to the drawing, Fig. 1 thereof shows an annular rotary brush section in which stranded brush material 1 extends substantially radially from an inner circular channelform back 2. I have modified brushes of this type by intruding a suitable plastic as described below between the strands of the brush material so that such material is completely embedded in the plastic matrix. Such brush material may be hard low damping capacity steel wire, and the intruded plastic may, for example, be neoprene having a certain amount of a filler such as bentonite incorporated therein together with the usual vulcanizing agents and the like. If desired, other abrasive powders may likewise be incorporated in the plastic material. The plastic is forced into the brush material within a suitable mold, the two sides of which may desirably be faced with cloth annuli 3 so that when, after curing, the finished article is removed from the mold, the cloth will adhere to the sides of the article as shown in Fig. 2. Instead of cloth, similar sheets of nylon or a rubber-containing compound may be employed. These facings serve several purposes. The cloth will prevent the plastic from adhering to the mold, this sometimes being an annoying problem in the molding of rubber and like plastic materials, and especially so in the case of the materials preferred for use in accordance with this invention. The facing of cloth or like material reduces any tendency of the stranded brush material to break out laterally of the highly filled low tensile strength matrix in which it is preferably embedded. The nylon and high tensile rubber-like facings are, of course, also acid and alkali resistant and afford further protection to the tool under certain working conditions. One very satisfactory form of side facing consists of cloth impregnated with a rubber compound, thereby providing both strength and protection from acids and the like. A typical example of a high tensile strength facing layer material is given below by way of illustration:

| | Parts |
|---|---|
| Neoprene | 100 |
| Zn.O | 5 |
| Mg.O | 5 |
| Anti-oxidant | 2 |
| Softener | 3 |
| Stearic acid | 1 |
| Clay | 50 |

The degree of resistance to abrasion of the plastic material which has been intruded into the brush material may be controlled by varying the amount of special filler therein, sufficient filler content causing such plastic to become somewhat crumbly under operating conditions at the working face of the tool.

By properly selecting the brushing material and the plastic matrix, a tool of this type may be provided in which the plastic wears or crumbles away at a slightly more rapid rate than the hard wire or similar brush material wears back. As a result, the ends 4 of the strands 1 will protrude very slightly from the matrix material affording in effect a short trim brush having a very high cutting capacity but in which the brush material is nevertheless resiliently mounted and has a very long useful life. As the tool wears down in use, there is no consequential alteration in the brushing face presented. As compared to the type of grinding wheel generally employed for such work, this new brushing tool, while having a very high cutting capacity which renders it useful for the removal of burrs, flash, and oxide coatings, for example, nevertheless provides a superior finish on the work-piece which usually obviates the necessity of any further finishing operation.

When my preferred hard brush material is employed in a resilient plastic composition as taught herein, any fracture due to impact or vibration will occur close to the working ends thereof which protrude slightly from the supporting matrix. This serves to keep such ends sharp without reducing the diameter of the tool with undue rapidity. Generally speaking, the less hard of the "hard" brush materials I may employ may protrude from such supporting matrix to a considerable extent without excessive long fracture in use. When, however, the Knoop hardness of the brush material exceeds 900 it becomes very important that such material protrude only very slightly from such matrix. Similarly, the harder the brush material, the more resistant the resilient plastic composition should be to abrasion so that it will crumble away from the working face only sufficiently to expose very short lengths of such brush material. Various compromises may, of course, be effected to obtain a particular desired set of operating characteristics.

Figure 3:
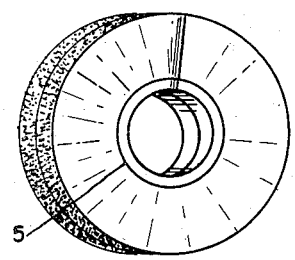
Fig. 3 is a similar view of another embodiment of my invention incorporating several turns of helically coiled brush strip.

Instead of employing a single annular brush section as above described, a cylindrical brushing tool having a wider face may be provided by similarly intruding plastic into several turns of helically wound brush strip 5 as shown in Figs. 3 and molding the same in an appropriate mold.

Figure 4:
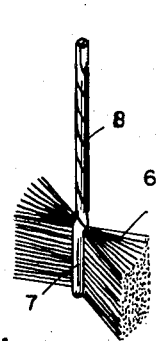
Fig. 4 is a perspective view of another type of brush adapted to be modified in accordance with my invention.
Figure 5:
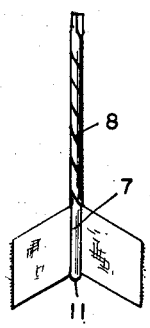
Fig. 5 is a side elevational view of a brushing tool formed in accordance with my invention and employing the brush of Fig. 4 as a constituent part thereof.
Figure 6:
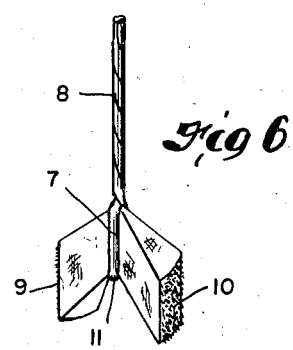
Fig. 6 is a perspective view of the brushing tool shown in Fig. 5.

The brush illustrated in Fig. 4 of the drawing is of a type employed commercially for several years for brushing the interior surfaces of deep cavities such as connecting rod bearing holes and the like. It comprises a tuft of stranded brush material 6 tightly clamped between two straight parallel portions of a rebent wire 7, the two end portions of which are twisted together to form a stem 8. As shown in Figs. 5 and 6, I intrude a suitable plastic into the brush material of this brush and mold the same with the brush material inclined downwardly so that in the finished article, after curing, the lower portions of the two work faces 9 and 10 are below the point 11 of bending of retaining wire 7. Consequently, this tool may be employed safely in blind holes without danger of the rebent portion 11 of the wire retaining member striking the bottom of such holes. It will be understood that tools of this type will ordinarily be mounted in the chuck of a rotary drill or the like.

Figure 7:
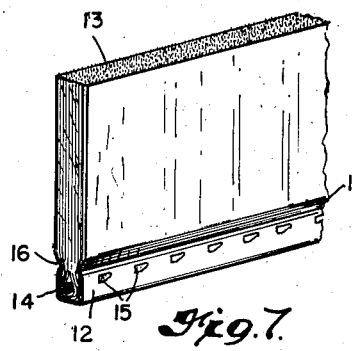
Fig. 7 is a perspective view of a length of brush strip which has been modified in accordance with my invention.
Figure 8:
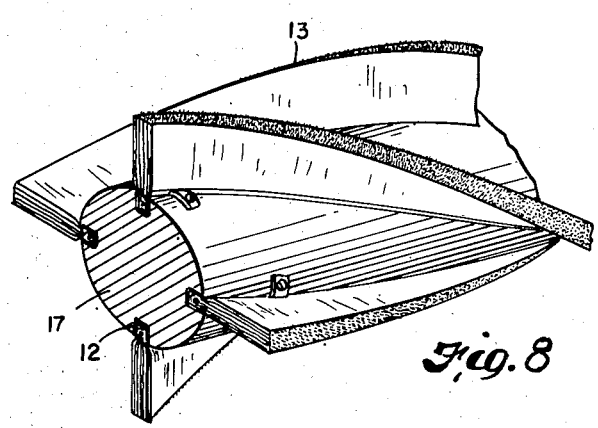
Fig. 8 is a perspective semi-diagrammatic view of one type of rotary tool utilizing the element of Fig. 7.
Figure 9:
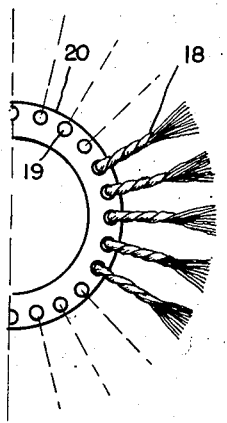
Fig. 9 is a fragmentary detail view of one form of rotary brush element well known in the art.

Referring now to Figs. 7 and 8 of the drawing, I may similarly intrude an appropriate plastic material between the strands of the brush material of any well-known type of brush strip such as that shown in my prior Patent No. 2,303,386 having a channelform back 12 and stranded brush material 13 retained therein by means of a retaining wire 14 permanently secured in such back by teeth punched in from the sides of the channel at 15. The mold cavity in which the length of brush strip is placed for intrusion of the plastic will preferably have parallel side walls so that the two sides of the finished article will be parallel instead of somewhat flaring as is generally the case with such brush strip. It is desirable not only that the thickness of the working portion of the element be uniform but also that such thickness be slightly greater than the width of the channelform back 12. This will ordinarily mean that a slight shoulder 16 will be provided a short distance above the upper edges of the channel sides. As shown somewhat diagrammatically in Fig. 8, brush elements of this type may be twisted slightly helically and mounted in this position in a suitable rotor 17.

Figures 9 to 15 are fragmentary views of rotary brushes of the general type illustrated and described in Bickel et al. Patent No. 2,062,047. In this well-known type of brush, tufts of bristle wire 18 are inserted through holes 19 in an annulus 20 and twisted on themselves, both to secure them in place and to cause the wires of each tuft to mutually reinforce each other. Annular brush elements of this type are commonly employed in cup brushes as shown in such Bickel et al. patent or clamped between side flanges to form annular rotary brushes. The ends of the bristles of such twisted tufts have not been as effective as desired, however, in their brushing action, due to the fact that some incline in one direction and some another whereas for many purposes such ends should preferably extend directly radially for best results. Furthermore, relatively tough, low hardness, high damping capacity wire has been employed in the past, further sacrificing cutting efficiency and tending to long fracture.

Figure 10:
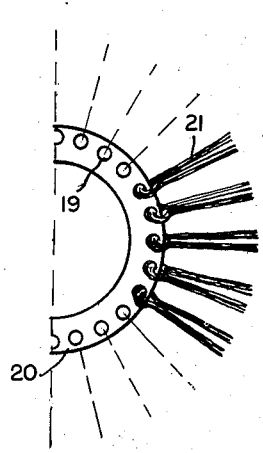
Fig. 10 is a view of a similar element modified for use in accordance with my invention.
Figure 11:
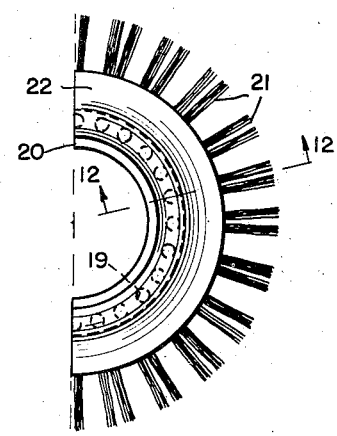
Fig. 11 is a fragmentary view of an annular rotary tool employing the element of Fig. 10.
Figure 12:
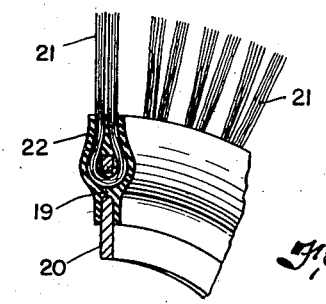
Fig. 12 is a view in cross-section taken along the line 12—12 on Fig. 11.

I have found that a much improved rotary brush may be produced by employing straight untwisted tufts 21 of hard, low damping capacity bristle wire doubled through holes 19 in annuli 20 as shown in Fig. 10. A rubber compound or other similar resilient plastic material 22 is molded about the outer periphery of such annuli (Figs. 11 and 12), overlapping a portion thereof and extending sufficiently radially outwards to resiliently support the straight tufts 21. Such resilient plastic also serves to secure such tufts in holes 19 without the necessity of twisting. The rubber compound or similar plastic material may be applied to either side of the annulus 20 by spraying or in the form of rings of the uncured material. The brush will then be placed in a suitable mold and cured.

Figure 13:
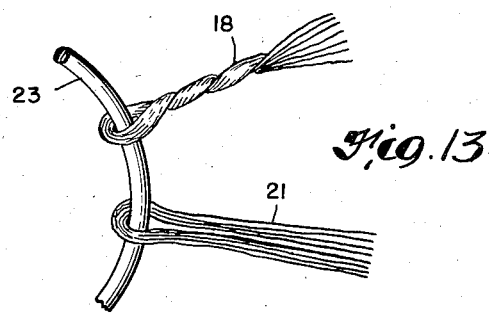
Fig. 13 is a fragmentary view illustrating another method of mounting the brush material of Figs. 9 and 10.
Figure 15:
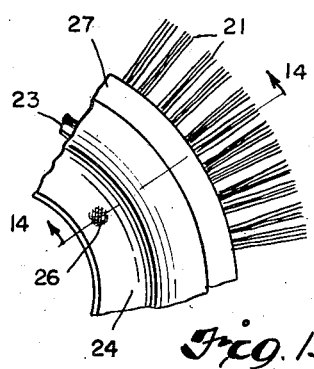
Fig. 15 is a fragmentary view of an annular rotary brush employing brush material shown in Fig. 13.
Figure 14:
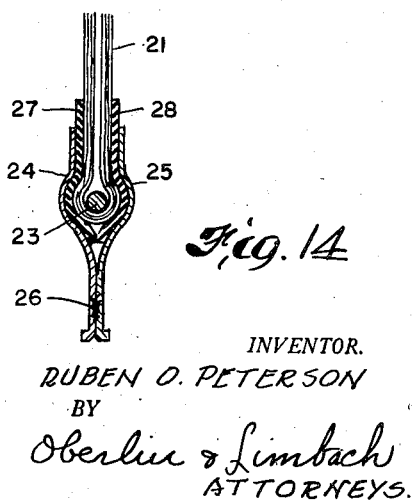
Fig. 14 is a cross-sectional view taken along the line 14—14 on Fig. 15.

Figures 13 to 15 inclusive illustrate a related form of brush in which, in the past, twisted tufts 18 have been mounted on a wire ring 23 and clamped between annular side plates 24 and 25 for mounting on an arbor or the like. Such clamping side plates may be secured together at 26 by spot-welding or rivets, for example. I merely loop my straight tufts 21 of hard, low damping capacity brush material about wire ring 23 and interpose layers 27 and 28 of a resilient plastic such as a rubber compound between the same and the two lateral clamping members 24 and 25. As shown in Fig. 15, such layers will desirably extend somewhat beyond the outer peripheral edges of such members 24 and 25 and will also enclose the base of tuft 21. Such plastic layers, when subjected to pressure in the curing mold, will join between the tufts to permanently seat and position the same. Thus, straight steel wire having high cutting capacity may be employed as the brush material without excessive "long fracture" of the bristles. The resilient plastic serves to dampen vibration and to prevent deleterious interaction between the bristles. Instead of employing the usual steel side clamping plates 24 and 25, a one-piece plastic support of similar conformation may be molded in place, such plastic, of course, being of a relatively firm and rigid type such as provided by certain nylon and rubber formulate. A small amount of flexibility in such support may often be desirable when a plurality of annular sections are to be assembled in close side-by-side relationship.

Figure 16:
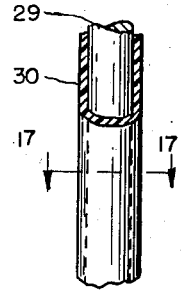
Fig. 16 is an enlarged view of a novel type of stranded brush material which may be employed in the brushing tools of my invention.
Figure 18:
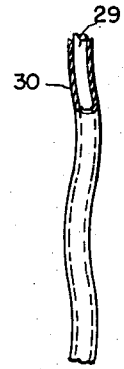
Fig. 18 is a view of a strand of brush material similar to that of Fig. 16 but crimped in a plurality of angularly related directions.
Figure 17:
Fig. 17 is an end view of the strand of Fig. 16.
Figure 20:
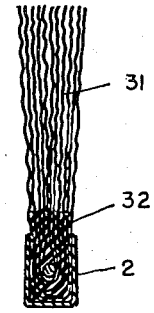
Fig. 20 is a sectional view of such latter construction.
Figure 19:
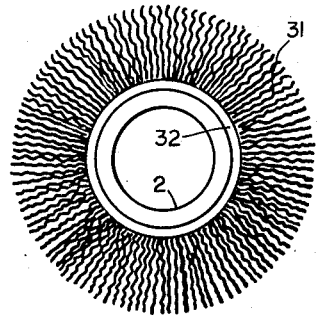
Fig. 19 is a view of a brushing tool of a construction generally similar to that of Fig. 1 but employing stranded material of the type shown in Fig. 16 seated in a resilient plastic composition.

In certain embodiments of my invention I may also employ a new and improved form of stranded brush material of the type somewhat diagrammatically illustrated in Figs. 16 to 18 inclusive. Such material may comprise an inner core 29 of stranded brush material such as steel wire or glass fiber, for example, provided with a thin protective coating 30 of a plastic material such as nylon, rubber, neoprene, various vinyl synthetic plastics, and Pliofilm (rubber hydrochloride). Stranded material 31 of this type may be retained in an annular channelform back 2 containing an excess of a plastic matrix composition which, when molded and cured, may extend from such back a short distance along the stranded brush material, embedding and seating the same in a resilient base 32. It will be appreciated that such coated stranded brush material may similarly be employed in other types of brushing tools such as those shown in Figs. 12 and 15, for example.

The inner core of such stranded brushing material may desirably be of the hard, low damping capacity type discussed more in detail elsewhere herein. The thin coating not only protects against corrosion and scratching but also assists in damping vibration so that, in cooperation with the resilient plastic base in which the strands or bristles are embedded, danger of long fracture is greatly reduced.

The plastic coating material may include fillers and abrasive similar to the matrix compositions employed in the manufacture of tools of the Fig. 2 type, whereas the resilient base material 32 will ordinarily contain no abrasive, performing a function generally similar to the resilient plastic seating material 27, 28 (Fig. 14). It is often advantageous to employ an appropriate lubricant absorbed in the filler to prevent smudging of the work (see below).

The coated stranded brush material above described may be crimped (Fig. 18) in different angularly related planes so that successive curves lie in different planes. Such curves will ordinarily be relatively long and smooth. They may, for example, be produced by passing the strand between interlocking gear-like rollers. If glass fiber or similar material which will not hold a crimp as does steel wire is employed, it may sometimes be necessary to heat the rollers to cause the plastic coating to set in crimped form. Crimping provides the advantages discussed above and tends to prevent fluttering when the tool rotates at high speeds. It is more particularly applicable where the core material is not of the harder types contemplated.

While, as above indicated, the softer, self-damping brush materials tend to generate destructive heat, this tendency is mitigated when the strands are plastic-coated and plastic-embedded as taught herein since the plastic composition takes over a large portion of the damping function and the steel wire or like core is not permitted to wear itself out fighting vibration. Thus my new brushing tool represents a distinct advance in the art even when the usual soft, high damping capacity brush material is incorporated therein.

The plastic coating material may desirably be modified by inclusion of an appropriate filler so that it will crumble back slightly at the ends of the strands in use to expose a short length of the core material. However, for very thin coatings, this is generally unnecessary. If such coating also contains abrasive, this crumbling action will steadily supply the same to the working surface of the tool in a manner to be effectively applied to the work by the exposed end of core material.

Having thus described various illustrative embodiments of my invention, I will now explain in greater detail the qualities and functions of the several components of my new brushing tool.

*The brush material*

Considerable improvement is obtained when conventional stranded brush material such as wire of relatively high damping capacity, and tampico fiber, for example, is embedded in plastic as taught by my invention but the most striking results are achieved when a hard, low damping capacity brush material is set in a resilient plastic matrix.

The attitude of workers in the prior art toward the problem of brush material fracture has been to seek tougher materials. While toughness is a desirable quality, it is not as important as several other considerations. Tough steel wire is relatively soft so that the ends of the bristles round over in use and quickly lose their cutting ability. Nor do they have sufficient resistance to bending and "snap action," which is such a desirable characteristic in brushes. Wire of this type has much higher damping capacity with consequent rapid absorption of vibrations. This self-absorption of vibratory stresses and strains develops internal friction and heat which is a primary cause of fracture. When such absorption of vibratory stresses becomes concentrated at points relatively far removed from the working ends of the strands, long fracture thereof results and the brush consequently has a very short life. By the means herein taught such concentration of stresses at undesired points can be prevented.

A rotary brush revolves at such speeds that each strand is kept vibrating at all times from repeated contact with the work, whether such strands be of the high or low damping capacity type. Low damping capacity material is much less susceptible to self-destruction from this particular cause, however, since it does not do as much work fighting against vibration. Hard brushing materials are therefore desirable not only for their increased cutting capacity but also for the relatively low damping capacity which is generally associated therewith.

The plastic material from which the bristle material extends to a greater or lesser degree prevents or greatly reduces interaction of such bristles and yet affords a resilient mounting therefore. I have consequently been enabled to employ relatively hard and brittle brush materials to obtain optimum brushing action coupled with long life.

The shorter the trim, the higher the frequency of bristle vibration, which is particularly destructive to high damping capacity materials. And the shorter the trim the greater the tendency of soft brush material to bend to an undesirable degree from the normal action of a power operated brush. It is therefore of further importance that low damping capacity hard brush materials be employed in the embodiment of my invention illustrated in Fig. 3, for example, and described above.

Thus, while common types of brush material such as tampico fiber and the usual steel wire may be employed with improved results in accordance with my invention I prefer relatively hard, low damping capacity stranded material such as the following:

Hard steel wire (severe quench and a minimum draw back)
Glass fiber
Beryllium copper wire
Stainless steel wire
"Z" nickel wire (hard-drawn, heat-treated, relatively pure nickel)

The last two materials listed have somewhat greater damping capacity than the others. It is interesting to note that an ordinary brush employing stainless steel wire was observed to have about one-third the life expectancy of a brushing tool employing the same wire but constructed in accordance with my invention. The resilient plastic takes over much of the damping function and literally saves the life of the brush material.

I prefer that the brushing material have a Knoop hardness in excess of 600, and very desirably in excess of 800. (The Knoop hardness test is a United States Bureau of Standards test and is particularly suited to measure of the hardness of fine filaments.) Such materials constitute a category not previously successfully employed.

The degree of hardness obtainable will, of course, vary with the material employed. Thus glass fiber is available which is considerably harder than most harder grades of steel wire, and the latter may be had harder than stainless steel, for example. It is a general characteristic, however, that as hardness increases so does brittleness and notch sensitivity and the more important becomes the provision of my resilient, high damping capacity material in association therewith. With my modified construction I have employed stranded brush materials having a Knoop hardness in the 800 to 900 range with very great success. Generally, the harder (and more brittle) such material the more completely I embed the same in the resilient plastic matrix and the more abrasion-resistant such matrix should be, so that it will crumble away only sufficiently to expose very short end portions of the strands.

Even when employing brushing materials of relatively low hardness in the range now in general use, embedding the same in my resilient plastic matrix which permits only short end portions to protrude renders the same more rigid (like a short-trim brush) and more effective in the application of abrasive.

In the case of steel wire, wire having a tensile strength of at least 300,000 p. s. i. attained by tempering (rather than by drawing) will be in the upper range of Knoop hardness (and scratch hardness) which places it in the category of especially hard materials which I am now enabled to employ with superior results.

*The plastic*

The plastics employed should ordinarily be able to withstand reasonably high operating temperatures without softening or smearing the work. Examples include:

Rubber (if operating temperatures not too high)
Neoprene (polychloroprene)
Hycar (modified copolymers of butadiene and acrylonitrile)
Nylon (polyamide resins)
Vinyl plastics (vinyl polymers and copolymers)
Melamine resins (melamine-formaldehyde reaction products)

It will be understood that in employing such plastics the same will ordinarily have included therewith suitable fillers as well as the usual vulcanizing agents or the like to produce the resilient plastic composition for my purpose.

In producing "short trim" type brushes such as illustrated in Fig. 3, the more resilient plastics will usually be employed in conjunction with wire brush material and the harder plastics (such as melamine) with tampico fiber and similar materials. The plastic will preferably be intruded into the brush material of the assembled brush axially thereof in order to obtain maximum uniformity of distribution of the bristles in the plastic matrix. Liquid resins such as melamine are more easily intruded into tampico and like brush material which is relatively flexible. The brush may first be wetted with melamine or other suitable adhesive, abrasive powder applied, and placed in a mold. Melamine with entrained abrasive and other constituents is now intruded and heat and pressure applied to polymerize the resin. A relatively stiff product is obtained reinforced by the tampico bristles and effective in applying abrasive to the work. In all cases the plastic material must be strong enough to resist the outward pull of centrifugal force at operating speeds and should not break out in large pieces. It will be sufficiently resilient to prevent permanent deformation in use and should have a relatively high damping capacity. It is furthermore generally desirable that the plastic material be able to withstand a certain amount of contact with oil and grease.

When employing wire brush material, plastic compounds such as those having a neoprene base may have their bond to such brush material improved by first applying a cement to the material, such cement preferably comprising a synthetic rubber and resin composition such as is commercially available under the name of "Ty-Ply-S" (Vanderbilt). The cement may be applied by spraying, dipping, or painting the previously thoroughly cleaned brush material. The brush should then be properly dried before intruding the plastic matrix material. Another excellent adhesive for my purpose is sold under the name Miccrosol by the Michigan Chrome and Chemical Company. It is applied in two steps, first a primer and then the adhesive proper.

A resilient plastic matrix for embedding the bristle material which has been found very satisfactory may be compounded according to the following formulation:

| | Parts |
|---|---|
| Polyvinylchloride (resin) | 100 |
| Dioctol phthalate (plasticizer) | 65 |
| Tribasic lead sulphate | 3 |
| Aluminum oxide (500 mesh grit) | 168 |

The foregoing ingredients form a paste which may be intruded between the bristles and set by subjecting to a temperature of approximately 300° F. The resultant matrix is adapted resiliently to support the substantially entirely embedded bristles but is less abrasion resistant than most industrial brush bristle material so that it will wear back in use at a rate continuously to expose shorter outer end portions of such bristles, affording a substantially constant effective protruding bristle length and therefore maintaining substantially constant brushing characteristics. This novel construction is, of course, of particular advantage and effectiveness when employing extremely hard stranded or filamentous bristle materials, and a very "short trim" brush is produced.

Fillers

When the plastic is employed to embed the brush material substantially completely therein to produce a "short trim" brush effect the plastic should not be so resistant to abrasion and wear that the ends of the brush bristles will not protrude therefrom. Thus, ordinary tire tread rubber containing certain selected carbon blacks is not suitable for my purpose as it is very resistant to abrasion and will not crumble or wear back at a rate appreciably greater than that of bristle material embedded therein. A buffing action is therefore obtained rather than the brushing or cutting action it is an object of my invention to provide. Moreover, it tends to smear the work.

To produce a tool of the type such as that illustrated in Figs. 2 and 3 and described above, for example, I may first incorporate a selected filler in the plastic material so that such material, while still quite resilient, will be less abrasion resistant and will wear or crumble away in use at a rate slightly faster than the ends of the bristles wear back. The working face of the tool will therefore always consist of very short (in some cases on the order of $\frac{1}{32}$ of an inch long) bristles projecting from the resilient plastic matrix. Such construction affords entirely novel characteristics in use, particularly fast cutting action coupled with a relatively smooth finish on the work-piece. It futhermore makes possible the use of brush material otherwise too brittle and makes such use advantageous. As extremely short bits fracture from the ends, such material constantly sharpens itself.

Typical examples of such suitable fillers include:

Finely crushed stone, such as limestone
Asbestine powder (asbestos gangue)
Kaolins
Clays, such as bentonite
Whiting
Various mixtures of the above Rubber and the various synthetic plastics which may be employed are commonly combined with several other ingredients, including fillers, in a manner well known in the art. In fact, the final plastic material may comprise a composition of which only about one-fifth is constituted by the original pure plastic, such as neoprene, for example. The degree of abrasion resistance of such final plastic material relative to that of the brush material may be controlled and modified as necessary by employment of the proper proportion of fillers. When cured, such final plastic material should display at least some degree of resilience and should neither be hard (like hard rubber) nor overly tough and abrasion resistant (like tire tread rubber).

In some forms, such as a tampico brush section having a melamine plastic material and entrained filler and abrasive intruded therein, the finished article will be rather stiff but nevertheless somewhat resilient and the plastic material will crumble or wear back at a rate effective to deliver abrasive to the slightly exposed bristle ends. I prefer to employ fillers which are themselves mildly abrasive and therefore afford a cleansing action on the work. Such fillers should ordinarily be relatively free from iron oxide and the like and without tendency to smudge the work so that there will not be deposition of fine corrosion promoting particles thereon. They may also desirably display an ability to absorb certain lubricants which assist in preventing smudging of the work (see below).

Abrasives

It is often desired to apply abrasive to a work-piece in addition to the cutting or polishing action which may be produced by the brush material. In fact, brushes are often employed primarily as a means of applying powdered abrasive.

Wire brush material would be an excellent applicator of such powdered or granular abrasive except for the difficulty in inducing it to hold the same, even when the abrasive is supplied in the form of a paste to assist it in adhering to the wire strands. By incorporating the abrasive in the plastic employed in the "short trim" brushing tool above described, such abrasive is continuously supplied to the working face of the tool as the plastic crumbles away.

Typical examples of suitable abrasives for use in accordance with my invention include:

Aluminum oxide ("Alundum," "Aloxite" corundum)
Silicon carbide ("Carborundum")
Chrome oxide
Natural abrasives (e. g. pumice, emery)
Mixtures of the above The aluminum oxides are particularly suitable where good abrasive action combined with the production of a relatively good finish is desired.

The silicon carbides make hard and sharp abrasives for maximum cutting action.

Chrome oxide is employed to give a finish on stainless steel and similar materials.

Pumice produces a fine finish on certain types of work, and the various examples of filler materials set forth above generally have a sufficient although mild abrasive action to have a cleaning effect on the work, thus serving a dual purpose.

The employment of abrasive in the plastic may further increase the heat generated by the tool in use. Some plastics, when heated sufficiently, tend to smudge the work but I have found that inclusion of the above-mentioned fillers greatly reduces such tendency, the filler having a lubricating effect on the freshly cut surface of the work-piece, preventing adherence of the plastic. Small amounts of special lubricants such as paraffin wax, sulphonated oils, and cerotic acid (synthetic beeswax) may also be incorporated in the plastic to enhance such lubricating, smudge-preventing effect. A preferred method of incorporating such lubricant is to treat the filler therewith before adding the latter to the plastic compound. Certain of the clays, such as bentonite, are especially satisfactory for such purpose.

While the brush voids or interstices are usually substantially completely filled with the plastic material containing the entrained abrasive, this fact does not detract from the effectiveness of such abrasive, which is automatically fed to the working face of the brushing tool as the plastic material crumbles back. This is in contrast to the ordinary grinding wheel where the structure should be porous to partially expose the individual abrasive grains for efficient cutting action.

It will be seen from the foregoing that I have provided three principal modified forms of my invention:

The first comprises a brushing tool in which the stranded brush material is substantially completely embedded in a resilient plastic matrix, such matrix being characterized by the fact that it will crumble or wear back in use to expose short end portions of the stranded brush material. Various types of power-driven rotary brushes may be employed in the production of this new tool, including annular sections, helically wound cylindrical or "roller" brushes, cup brushes, and end brushes. Straight lengths of standard brush strip may likewise be modified in the described manner and mounted on rotors as shown in Fig. 8. Abrasives and lubricants optionally may be incorporated in the plastic material to achieve desired results as explained above.

Various amounts of various fillers may likewise be included in the plastic material to impart to the latter the proper degree of crumbliness or "cheesiness" under conditions of use to cause the same to wear back at the working face at a slightly greater rate than the brush material.

While improved results are obtained using conventional brush materials, this construction for the first time permits the successful employment of hard, relatively brittle, low damping capacity stranded materials or fibers to obtain a greatly enhanced cutting action and longer wear. The brush material, of course, also serves to reinforce the somewhat crumbly plastic so that such plastic is worn away at the working face of the tool only. The high tensile strength of most of the stranded materials which I prefer to employ adds much to the bursting strength of the tool. The plastic protects the length of the strands or bristles from the disastrous effects of vibration concentration as well as preventing interaction therebetween in use. Corrosion by the atmosphere or materials present under certain working conditions is also obviated.

Three specific examples of plastic compositions employed in the production of this type of tool follows:

I

| | Parts |
|---|---|
| 1. Hycar | 100 |
| Filler (Whiting) | 400 |
| 2. Rubber sub | 50 |
| 3. Softener | 30 |
| Sulphur | 3 |
| Altox | 1 |
| Thionex | .1 |
| Zinc oxide | 5 |
| Stearic | 1 |

II

| | Parts |
|---|---|
| 1. Neoprene | 100 |
| Filler (Whiting) | 400 |
| 2. Rubber sub | 50 |
| 3. Softener | 30 |
| Zinc oxide | 5 |
| Stearic | 1 |
| Magnesium oxide | 5 |

III

| | Parts |
|---|---|
| 1. Neoprene | 100 |
| Zn. O | 5 |
| Mg. O | 5 |
| Anti-oxidant | 2 |
| 3. Softener | 30 |
| Stearic acid | 1 |
| 2. Rubber sub | 50 |
| Limestone (filler) | 250 |
| Clay (filler) | 100 |

NOTES:

(1) Both Hycar and neoprene are synthetic rubberlike materials.

(2) So-called "rubber substitutes" are commonly employed in compounding rubber and similar plastics, and may comprise blown oils.

(3) The softener was a petroleum distillation product. Waxes commonly used in the rubber industry may be employed for this purpose.

It will be noted that a great deal more filler is employed in these examples than in the example of facing composition given above. In fact, the amount of filler may comprise three or four times the amount of pure plastic, and even more.

Annular rotary brush sections having hard, low damping capacity steel wire brush material with a high tensile strength of over 350,000 p. s. i. were placed in molds and the above plastic compositions intruded into such material. After curing, the resultant rotary tools were tested and showed notable effectiveness in such fields as burr removal, flash removal, and removal of oxide coatings from metal surfaces. A finish was left far superior to that obtainable with conventional grinding wheels applied by similar offhand methods. It was found that such tools would remove steel burrs in approximately five seconds' time which required forty-five minutes to remove with the standard brush commercially available best suited for such purpose.

The second principal modification of my invention comprises a brushing tool in which the brush material is mounted, seated, or embedded in resilient plastic material about its basal portions only, adjacent to the point of securing of such material in the brush back (Figs. 9–15, for example). In this embodiment neither abrasive nor special fillers will ordinarily be employed (except certain fillers commonly used in compounding rubber) since it is not intended that such plastic will contact the work. Certain hard, low damping capacity, high tensile brush material may desirably be utilized in tools of this construction, the protective high damping capacity plastic extending sufficiently therealong to greatly reduce deleterious vibration and interaction or working of the strands or bristles against one another. Such plastic material also aids in securing the bristle material to the brush back, eliminating the necessity of twisting the tufts and thereby permitting such bristles to extend in straight and more effective form. This is especially advantageous in the case of certain hard and composite brush material which cannot be twisted readily. Brushes of this type are very effective in high speed, heavy duty operations such as cleaning welds, removing hardening scale and burrs, and preparing large steel surfaces for painting.

The third principal modification comprises a brushing tool in which strands of brush material provided with a plastic coating are seated in resilient plastic material. This form of tool may be considered as somewhat of a compromise between the first and second forms above discussed. Only the inner portions of the composite strands are embedded or seated in a plastic matrix or support so that the tool may be of the "long trim" type similarly to the forms shown in Figs. 11 to 14. On the other hand, since the individual strands are provided with a protective coating, such strands are guarded against corrosion analogously to the Fig. 2 form of tool, and to a lesser but important degree such coating also serves to dampen vibration and limit interaction of the strands. If abrasive and filler materials are included in the plastic coating composition such coating will also serve to supply abrasive to the working ends of the strands at it crumbles back.

It will be seen from the foregoing that I have provided a novel brushing tool which may be of the short trim or long trim type and which so supports the brush material that relatively hard, low damping capacity materials may be employed. The particular form of brushing tool to be employed will of course depend on the special circumstances surrounding each application, but it will be obvious that a wide range of forms is available within the teaching of my invention. In addition, all of the objects of my invention set forth above have been accomplished.

In the Fig. 9 to Fig. 15 embodiments, the individual filaments, preferably having a Knoop hardness of 600 or more, may be coated with a thin layer or sheath of a relatively tough plastic material such as nylon and then mounted in a resilient base portion as shown, extending therefrom to form a long trim brush. Of course, each bristle may likewise comprise a bundle of fine wire filaments or glass fibers, for example, with the plastic sheath enclosing the same.

Another form which is sometimes advantageous comprises a brushing tool in which the bristles having an inner filamentous or stranded core preferably of material having a Knoop hardness of 600 or more are coated with a thin tough plastic sheath such as nylon and then embedded substantially entirely in a relatively readily abradable or crumbly resilient plastic matrix as in the Fig. 2 embodiment. It will be appreciated that the last-described tool will be of the self-maintaining short trim type, since the bristle ends will always protrude slightly from the matrix due to erosion of such matrix in use, but such protruding end portions will retain much of their individual thin nylon or other relatively tough coatings. Such tools are especially resistant to corrosion. A detailed description of various composite bristles suitable for thus embedding in the resilient, more readily abradable, matrix may be found in my co-pending application Serial No. 58,670.

This application is a continuation-in-part of my co-pending application Serial No. 50,850 filed September 23, 1948, now abandoned, and Serial No. 58,670 filed November 6, 1948 now Patent 2,682,734, July 6, 1954.

Other modes of applying the principle of the invention may be employed, change being made as regards the details described, provided the features stated in any of the following claims or the equivalent of such be employed.

I therefore particularly point out and distinctly claim as my invention:

1. A brushing tool comprising a base portion including a body of resilient material, and brush bristle material embedded in said body of resilient material and extending therefrom, the individual strands of said brush bristle material comprising bundles of glass filaments and outer sheaths of flexible plastic closely encasing the same, said filaments having a Knoop hardness of at least 600.

2. A brushing tool comprising a base portion including a body of resilient high damping capacity plastic material, and low damping capacity brush bristle material having a Knoop hardness of at least 600 embedded in said body of resilient material and extending therefrom, the individual strands of said brush bristle material having a thin plastic coating thereon protecting the portions of said brush bristle material protruding from said body, said brush bristle material being hard and brittle and thereby adapted to maintain sharp cutting edges at the extreme outer ends thereof upon impact with the work in use.

3. A rotary brushing tool comprising a base portion including a body of resilient high damping capacity plastic material, and radially disposed crimped wire brush bristle material having a Knoop hardness of at least 600 embedded in said body of resilient plastic material and extending therefrom, the individual strands of said brush bristle material having a thin plastic coating thereon protecting the portions of said brush bristle material protruding from said body, said brush bristle material being hard and brittle and thereby adapted to maintain sharp cutting edges at the extreme outer ends thereof upon impact with the work in use.

4. A rotary brushing tool comprising a base portion including a body of resilient high damping capacity plastic material, and radially disposed brush bristle material having a Knoop hardness of at least 600 embedded in said body of resilient plastic material and extending therefrom, the individual strands of said brush bristle material having a thin plastic coating thereon protecting the portions of said brush bristle material protruding from said body, said brush bristle material being hard and brittle and thereby adapted to maintain sharp cutting edges at the extreme outer ends thereof upon impact with the work in use.

5. A rotary brushing tool comprising a base portion including a body of resilient high damping capacity plastic material, and radially disposed brush bristle material having a Knoop hardness of at least 800 embedded in said body of resilient plastic material and extending therefrom, the individual strands of said brush bristle material having a thin plastic coating thereon protecting the portions of said brush bristle material protruding from said body, said brush bristle material being hard and brittle and thereby adapted to maintain sharp cutting edges at the extreme outer ends thereof upon impact with the work in use.

6. A rotary brushing tool comprising a radially outwardly facing channel base including a retaining member therein, radially disposed low damping capacity brush bristle material having a Knoop hardness of at least 600 secured in said base by said retaining member, the individual strands of said brush material having a thin coating of a resilient high damping capacity plastic thereon, and a body of resilient high damping capacity plastic material adjacent said base and embedding said brush material with such individually coated strands extending outwardly therefrom, said thin plastic coating protecting the portions of said brush bristle material protruding from said body, said brush bristle material being hard and brittle and thereby adapted to maintain sharp cutting edges at the extreme outer ends thereof upon impact with the work in use.

7. A rotary brushing tool comprising a radially outwardly facing channel base including a retaining member therein, radially disposed low damping capacity brush bristle material having a Knoop hardness of at least 800 secured in said base by said retaining member, the individual strands of said brush material having a thin coating of a resilient high damping capacity plastic thereon, and a body of resilient high damping capacity plastic material adjacent said base and embedding said brush material with such individually coated strands extending outwardly therefrom, said thin plastic coating protecting the portions of said brush bristle material protruding from said body, said brush bristle material being hard and brittle and thereby adapted to maintain sharp cutting edges at the extreme outer ends thereof upon impact with the work in use.

8. A rotary brushing tool comprising a base portion including a body of resilient high damping capacity plastic material, and radially disposed steel wire brush material having a Knoop hardness of at least 800 embedded in said body of resilient plastic material and extending therefrom, said plastic material being bonded to said wire brush material, the individual wires of said brush material having a thin vibration damping plastic coating thereon protecting the portions of said wire brush material protruding from said body, said wire brush material being hard and brittle and thereby adapted to maintain sharp cutting edges at the extreme outer ends thereof upon impact with the work in use.

9. A short trim brushing tool automatically operative to maintain a substantially constant effective protruding bristle length as such tool wears back in use and therefore to maintain substantially constant brushing characteristics, comprising a matrix of resilient, high damping capacity, material, and a plurality of bristles oriented in generally parallel spaced relationship substantially entirely embedded in said matrix, said matrix being less abrasion resistant than said bristles and therefore adapted to erode back in use continuously to expose short outer end portions of said bristles protruding an appreciable distance from said matrix, and each said bristle being individually coated with a sheath of plastic material more abrasion resistant than said matrix and accordingly effective to protect such protruding short outer end portions of said bristles.

10. A brushing tool in accordance with claim 9, wherein said plastic coated bristles comprise bundles of glass filaments with outer sheaths of flexible plastic closely encasing each said bundle.

11. A short trim brushing tool automatically operative to maintain a substantially constant effective protruding bristle length as such tool wears back in use and therefore to maintain substantially constant brushing characteristics, comprising a base portion, low damping capacity brush material having a Knoop hardness of at least 600 extending therefrom, a body of resilient high damping capacity plastic embedding all but short outer end portions of said brush material, said body of resilient plastic being adapted to damp vibration of said brush material under conditions of use and also to erode back in use continuously to expose protruding short outer end portions of said brush material, and a relatively thin coating on said brush material of plastic more abrasion resistant than said body and accordingly effective to protect such protruding short outer end portions of said bristles.

12. A short trim rotary brushing tool automatically operative to maintain a substantially constant effective protruding bristle length as such tool wears back in use and therefore to maintain substantially constant brushing characteristics, comprising a base portion, brush bristles secured to and extending from said base portion, a thin tough plastic coating on each individual bristle, and a matrix of resilient plastic embedding all but short outer end portions of said coated bristles and less abrasion resistant than said bristles and coating so as to erode back in use continuously to expose such protruding short outer end portions of said bristles having said tough plastic coatings thereon.

13. A short trim rotary brushing tool automatically operative to maintain a substantially constant effective protruding bristle length as such tool wears back in use and therefore to maintain substantially constant brushing characteristics, comprising a base portion, wire bristles having a Knoop hardness of at least 600 secured to and extending from said base portion, a nylon coating on the individual bristles, and a matrix of resilient plastic embedding all but short outer end portions of said coated bristles and compounded to be less abrasion resistant than said bristles and coating so as to erode back in use at a rate continuously to expose such protruding coated short outer bristle end portions having their tough plastic coatings retained thereon.

14. A short trim rotary brushing tool automatically operative to maintain a substantially constant effective protruding bristle length as such tool wears back in use and therefore to maintain substantially constant brushing characteristics, comprising a base portion, glass filament bristles having a Knoop hardness of at least 600 secured to and extending from said base portion, a nylon coating on the individual bristles, and a matrix of resilient plastic embedding all but short outer end portions of said coated bristles and compounded to be less abrasion resistant than said bristles and coating so as to wear back in use at a rate continuously to expose such protruding coated short outer bristle end portions.

15. A brushing tool comprising a base portion including a body of resilient high damping capacity plastic material, and low damping capacity brush bristle material having a Knoop hardness of at least 600 embedded in said body of resilient material and extending therefrom, the individual strands of said brush bristle material having a thin plastic coating thereon and a film of adhesive material adhering said strands to their said respective plastic coatings.

References Cited in the file of this patent

UNITED STATES PATENTS

| | | | |
|---|---|---|---|
| Re. 5,378 | Dimes | | Apr. 29, 1873 |
| 376,800 | Frisbie | | Jan. 24, 1888 |
| 587,048 | Topp | | July 27, 1897 |
| 634,617 | Hansen | | Oct. 10, 1899 |
| 1,497,974 | Cornell | | June 17, 1924 |
| 1,706,862 | Rickersberg | | Mar. 26, 1929 |
| 1,713,027 | Cleave | | May 14, 1929 |
| 1,817,176 | Curtis | | Aug. 4, 1931 |
| 1,944,955 | Sunnen | | Jan. 30, 1934 |
| 1,966,101 | Miller | | July 10, 1934 |
| 2,074,213 | Deem | | Mar. 16, 1937 |
| 2,100,138 | Heldt | | Nov. 23, 1937 |
| 2,129,279 | Kingman | | Sept. 6, 1938 |
| 2,146,284 | Churchill | | Feb. 7, 1939 |
| 2,232,389 | Jurkat | | Feb. 18, 1941 |
| 2,328,998 | Radford | | Sept. 7, 1943 |
| 2,388,867 | Peterson | | Nov. 13, 1945 |